Feb. 1, 1966 J. A. BUCKS 3,232,645
TUBULAR T INSERT
Filed Oct. 21, 1963 2 Sheets-Sheet 1

INVENTOR.
JOHN A. BUCKS
BY
Fay & Fay
ATTORNEYS

Feb. 1, 1966   J. A. BUCKS   3,232,645
TUBULAR T INSERT
Filed Oct. 21, 1963   2 Sheets-Sheet 2
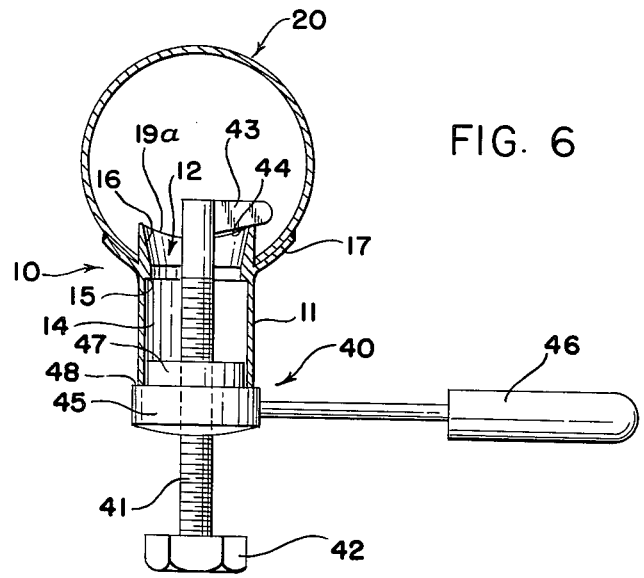
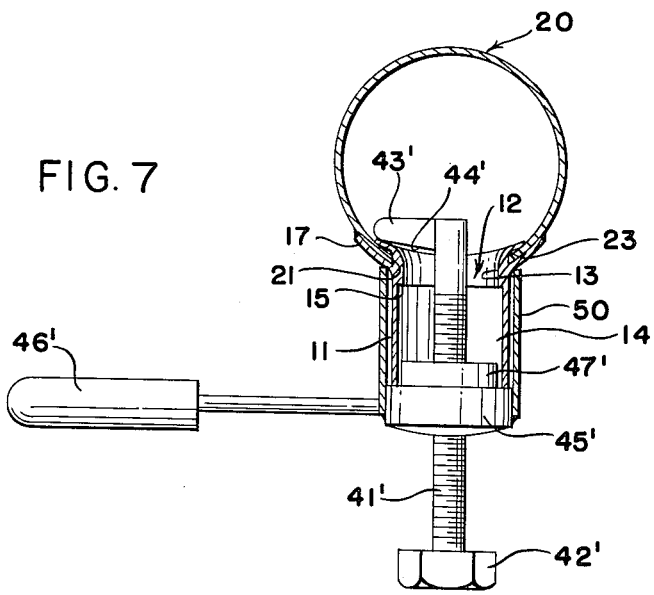
INVENTOR.
JOHN A. BUCKS
BY
*Fay & Fay*
ATTORNEYS

United States Patent Office 3,232,645
Patented Feb. 1, 1966

3,232,645
TUBULAR T INSERT
John A. Bucks, 24434 Garden Drive, Euclid 23, Ohio
Filed Oct. 21, 1963, Ser. No. 317,427
1 Claim. (Cl. 285—205)

This invention relates to tubular joints and more particularly to T fittings and the method of forming T joints in a tubing line.

In the installation of copper tubing or other bendable tubing formed of other suitable material, it has been necessary heretofore to plan carefully the precise locations at which a T joint is to be formed in the tubing line. Once the tubing has been installed to the point where a T is to be placed, the practice has been to sever the tubing line and insert at this point in the line a specially formed T. Once the T fitting has been attached to the severed end of the tubing line, the installation of the line is resumed until another point where a T is desired has been reached.

If the tubing is installed beyond the point where a T is desired, it is necessary to sever the line and remove a piece of the tubing to install a T joint. Further, with the installation of each T, it has been necessary to align the length of tubing with a certain amount of precision to assure the proper soldered joint. Such alignment is time consuming and is the occasion of a significant labor expense. Moreover, the completed line is a series of short pieces of tubing with T joints interconnecting the pieces of tubing. To assure the rigidity of the tubing line and prevent any subsequent leakage, it is necessary that a good soldered joint is made at each T. Further, the T's which are inserted in the line are relatively expensive and this cost, added to the labor costs, raises the costs of installation to a substantial level. By application of the principles of this invention, these defects enumerated above have largely been overcome.

Thus, it is an object of this invention to provide a tubular fitting for use in a line of bendable tubing.

It is a further object of this invention to provide a T joint for use in a tubing line.

Another object of this invention is to provide a tubular T insert which may be placed in a line of bendable tubing.

A more specific object of this invention is to provide a T joint which may be interposed at any point along the line of bendable tubing without breaking the continuity of the tubing line.

It is a still further object of this invention to provide a T joint which will permit the insertion of a T joint in any point along a line of bendable tubing without severing the tubing.

Another object of this invention is to provide a tubular T joint which is easily installed and stronger than the joints heretofore obtainable.

A further object of this invention is to provide a tubular T insert which may be inserted in an aperture in a line of tubing thereby to effect a T joint.

A still further object of this invention is to provide a method of inserting T joints in a line of copper tubing, which method will greatly reduce the time and expense heretofore required.

Still another object of this invention is to provide a tool which is usable in the method of installing tubular T inserts of the design disclosed herein.

Briefly, the T insert of the instant invention consists of a tubular body having a passage therethrough. Secured to the outer periphery of the body is a saddle member which is arcuate in configuration and which is adapted to conform to the external periphery of the tubing. A portion of the body is adapted to be received in an aperture in a line of bendable tubing, with the end of the body received in the tubing being designed to be deformed into contact with the wall of the tubing. The deformation of the inner end of the body is accomplished by a tool which includes a rotatable stem received in the passage of the body of the insert and includes a leg which exerts a compressive force on the lip of the body. This force compresses the lip of the body to form a radial flange which mechanically interconnects the body with the wall of the tubing.

To the accomplishment of the foregoing and related ends, the following description sets forth in detail one means of carrying out the invention, such disclosed means are not meant to be limiting, constituting but one of the various ways in which the principles of the invention may be used.

In the drawings, wherein like reference numerals indicate like parts in the various views:

FIG. 6 is an end elevation view of a T insert received in a piece of tubing and illustrates the tool used in performing one step of the method of securing the T to the tubing.

FIG. 7 is a view similar to FIG. 6 and is an illustration of a further step of securing the T to the tubing.

Figure 3:
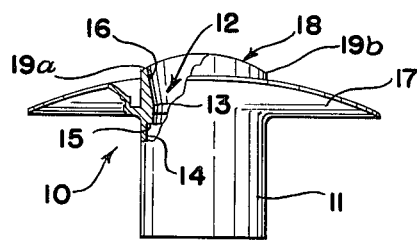
FIG. 3 illustrates a tubular T insert, partly in section, which embodies the principles of the instant invention.

Turning to FIG. 3 in the drawings, there is illustrated one embodiment of the T insert which incorporates the principles of the instant invention. Thus, the insert, indicated generally by the reference numeral 10, comprises a tubular body portion 11 having a longitudinal passage or bore 12 passing therethrough. The bore 12 includes two distinct portions, with the upper portion 13 being formed with a smaller diameter than the lower portion 14. A transverse shoulder 15 is provided at the juncture of the two portions 13, 14 and serves as an abutment for a piece of tubing in the manner shown in FIG. 1. The upper portion 13 of the bore 12 is bevelled outwardly to form a generally radially outwardly extending bevelled surface 16 with the bevel extending along the bore 12 to a point above the shoulder 15.

A generally radially extending saddle member 17 extends around the external periphery of the body 11 at a point generally midway between the upper end of the T insert and the longitudinal center of the body 11. More specifically, the juncture of the saddle member 17 with the body portion 11 is located above the transverse shoulder 15 and adjacent to the inner terminal portion of the bevelled surface 16. It is generally adequate to separate the inner terminus of the bevelled surface 16 from the juncture of the saddle 17 and body portion 11 by a distance which is equal to the thickness of the wall of the tubing in which the insert is to be received. The saddle 17 preferably is formed integral with the body 11. However, it may be made separate and secured by appropriate means to the body. The saddle 17 is of uniform thickness and preformed to an arcuate configuration which will mate with the outer periphery of a line of tubing. Thus, for a line of tubing having a given outside diameter, a complete series of inserts might be provided having varying sizes of bores 12, but all having preformed saddles 17 which would conform to the periphery of the tubing. For a different size of tubing having a different outer diameter, the saddle 17 would be preformed in corresponding varying configurations.

The upper lip 18 of the insert 10 has diametrically opposed arcuately contoured portions or recesses 19a and 19b with the contours being formed on a radius which is generally equal to the inner radius of the pipe in which the tubular insert is to be utilized. The arcuate contours 19a, 19b are formed in the lip 18 so that the contours are generally concentric to the longitudinal axis of the tubing when the insert is received therein.

The insert of FIG. 3 is used in he following manner:

A line of bendable tubing, such as copper tubing indicated generally by the reference numeral 20, is installed in the desired location. The line of tubing may be installed in one continuous line without regard to the lication of T's. With the tubing 20 in place, the location of the T's may be considered. At each point the tubing where it is desired to install a T joint, an appropriate aperture 21 is placed in the wall of the tubing 20. The diameter of the aperture 21 is equal to the outer diameter of the body 11 of the insert 10. The insert is introduced into the aperture 21 with the upper portion of the body 11 protruding into the interior of the tube 20. The saddle 17 conforms to the periphery of the tubing 20 and limits the inward movement of the insert 10.

Figure 1:
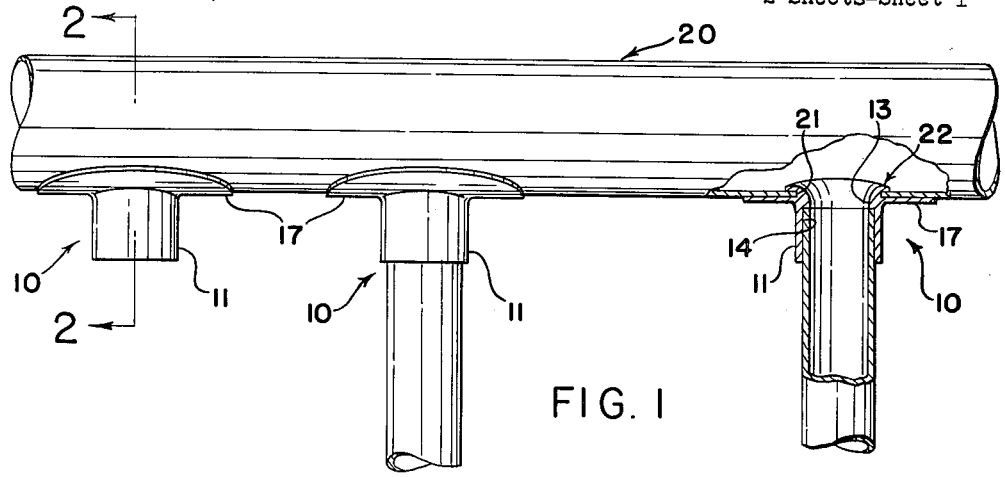
FIG. 1 illustrates a line of copper tubing with the T inserts of the instant invention incorporated therein.
Figure 2:
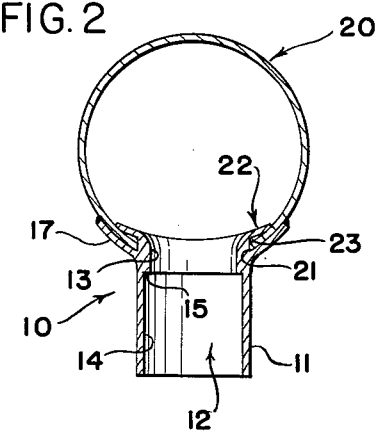
FIG. 2 is a view taken along line 2—2 of FIG. 1.

With the insert in place, the portion of the body 11 protruding into the interior of the tube is deformed to accomplish a mechanical connection of the insert to the tube. Thus, the wall of the tube 20 is, in effect, clamped between the deformed lip or flange 22 and the saddle 17 of the insert 10. The insert is further connected to the tubing 20 by solder or other appropriate means, as illustrated in FIGS. 1 and 2, with the solder penetrating inwardly of the saddle 17 and through the aperture 21 to form a connection 23 between the deformed lip 22 and the inner periphery of the tubing 20.

It is apparent that with the insert in place, a T joint is perfected which will function in a manner of the T's heretofore known. However, by using the inserts disclosed herein, it is possible to place a T at any point along the length of the tubing 2 with a minimum of time and expense. Moreover, in the event a T joint is needed sometime subsequent to the completion of the tubing installation, it is possible simply to form an aperture in the tubing and attach an insert in the manner hereinbefore disclosed. Further, it is possible to place the T joints much closer together than was possible with the T's heretofore available.

Figure 4:
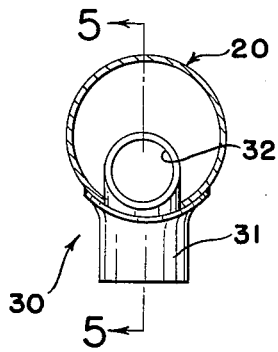
FIG. 4 is an end elevation of a modified monoflow T received in a line of tubing.
Figure 5:
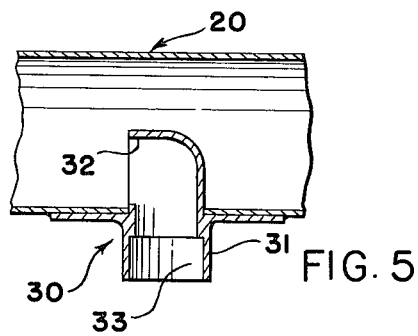
FIG. 5 is a side elevation view, in section, of the modification of FIG. 4, and is taken along lines 5—5 of FIG. 4.

Turning to FIGS. 4 and 5, there is illustrated a monoflow T which is essentially the same as the insert of FIG. 3. However, the monoflow T, indicated generally by the reference numeral 30 does not have the bevelled lip configuration shown in FIG. 3. Rather, the body portion 31 extends inwardly of the interior of the tubing and has a passage 32 which is transverse to the passage 33 in the body of the insert. The monoflow T is inserted in the tubing 20 in a manner similar to that described above with the exception that the step of deforming the lip to form the mechanical connection between the insert and the wall of the tubing is not performed.

It is apparent that many other configurations of inserts may be utilized and the two shown in FIGS. 3 and 4 are merely illustrative of the principles of the invention.

Turning to the principles of the method of installing an insert in a line of tubing, there is illustrated in FIGS. 6 and 7 two embodiments of a tool which are adapted to perform the step of deforming the lip 18 of the insert 10. Thus, the tool illustrated in FIG. 6, indicated generally by the reference numeral 40, comprises an elongated stem portion 41. The stem is threaded over the major portion of its length and terminates at one end in a hexagonal head 42. At the end of the stem 41 opposite to the head 42, there is provided a leg 43 which may be formed integral with the stem 41 or secured thereto by appropriate means. The leg 43 includes a bevelled surface 44 on the edge which faces the head 43 includes a bevelled surface 44 on the edge which faces the head 42.

Received on the threaded stem 41 is a body member 45 to which is secured a handle 46. The body member includes a centering boss 47 which is adapted to be received in the bore 12 of the insert. The body member 45 is of a diameter greater than the diameter of the body 11 and includes a shoulder portion 48 which is adapted to abut the lower end of the body 11 in a manner illustrated in FIG. 6.

To utilize the tool 40, the stem 41 is inserted in the bore 12 of the insert 10 and the body portion 45 is then threaded along the stem 41 until the leg 43 abuts the bevelled lip 18 and the body 45 abuts the lower end of the insert 10. This position is illustrated in FIG. 6. The boss 47 serves to locate the stem 41 in the bore 12 and positions the leg 43 such that rotation of the stem 41 will cause the leg 43 to traverse the entire periphery of the lip of the body portion. Restraining the body 45 from rotation by handle 46, the stem is rotated by an appropriate wrench which is applied to the head 42. Upon such rotation, the bevelled lip portion of the body is deformed radially outward of the body 11 to form the flange 22. The deformation of the lip 18 occurs due to the threaded connection between the stem 41 and the body 45. Thus, as the stem 41 is rotated, with the body 45 remaining stationary, longitudinal movement is imparted to the stem 41. This longitudinal movement tends to exert a compressive force on the lip 18 of the body portion and, due to the bevelled surface 44 of the leg 43, the bevelled lip portion is deformed radially outward of the body 11 to form the peripheral flange 22. Such deformation is facilitated by the bevel 16 formed on the upper portion of the body 11.

Upon each rotation of the stem 41, the stem is longitudinally displaced relative to the insert 10. This result is accomplished due to the coaction between the body member 45 which is held stationary by the handle 46 and the threaded interconnection of the body with the stem 41. As the stem is displaced longitudinally in the insert, it is apparent that the leg 43 continues to deform the upper lip of the insert until such time as the leg 43 engages the interior of the wall of the tubing.

To accomplish the formation of a smooth, mechanical interconnection, the contoured portions or recesses 19a, 19b of the lip 18 are oriented in the manner shown in FIG. 6. Thus, the insert is positioned in the tube such that the contoured portions or recesses are concentrically aligned with the longitudinal axis of the tubing. By this arrangement, the leg 43, which is limited in its path of rotation at its lower positions due to the interference between it and the walls of the tubing, need not be displaced to its lowest possible position. Accordingly, the stem 41 is threadedly displaced in the insert 10 only until such time as the leg 43 interferes with the wall of the tubing 20 as the leg is rotated. Absent the contoured portions 19a, 19b, a considerable portion of the insert 10 would remain projecting into the flow path in the tubing. However, the contoured portions 19a, 19b conform to the general curved configuration of the tubing and are concentric therewith so that the obstruction presented by the insert is greatly reduced.

It is believed apparent that, due to the recesses 19a, 19b and the fact that the leg 43 is restricted in its rotation when in its lower positions, the area of contact between the peripheral flange 22 and the wall of the tubing along the longitudinal axis of the tubing is subtantially less than the area along the transverse axis of the tubing.

A modified tool is illustrated in FIG. 7 wherein the same essential elements are utilized with the exception that a cylinder 50 is secured to the body 45' which cylinder is designed to telescope over the body 11 of the insert 10. Such an arrangement s utilized to obviate any buckling effect which may occur due to the column loading on the body 11 when the deforming of the lip 18 is being performed. Thus, the tubing 50 abuts the exterior lower surface of the saddle 17 and provides a reactive abutment such that any buckling which would tend to occur would occur in the wall of the cylinder 50 rather than the body 11.

It is believed apparent, in view of the above disclosure, that the objects set forth have been fully obtained. Thus, there is provided a T insert which performs in the manner of T joints heretofore known but which is more easily and cheaply installed. Further, there has been disclosed a method and a tool which are adapted to perform the placement of the T's with greater facility. It is believed that the joint formed by the T's hereinabove described is at least as strong as any particular application would require. It is, of course, apparent that the size of the saddle member bears a direct relationship to the stresses which the assembled T joint will withstand. Thus, the greater the area of the saddle member, the stronger will be the joint. For ordinary application, it has been found that a saddle having a breadth approximately equal to twice the diameter of the aperture in the tubing will be sufficient to form a sturdy joint. Other factors affecting the rigidity of the insert relate to the type of solder material used in securing the saddle member to the tubing wall, the degree of mechanical interconnection between the flange 22, the wall of the tubing, and the saddle 17, and the degree of penetration of the solder material between the flange 22 and the interior wall of the tubing 20.

For purposes of description, the principles of the invention have been set forth in connection with but a few illustrated embodiments. It is not my intention that the illustrated embodiments or the terminology employed in describing them be limiting inasmuch as variations of these may be made without departing from the spirit of the invention; but rather, it is my desire to be restricted only by the scope of the appended claim.

I claim:

A tubular insert adapted to be received as a T fitting in an aperture in a continuous length of bendable tubing for the transmission of fluids therethrough comprising:

a cylindrical body of malleable material having a substantially uniform outer diameter;

said body including a first bore in one end thereof;

said body further including a second bore in the other end thereof coaxial with the first bore, with the two bores forming a passage through said body;

the diameter of said first bore being greater than the diameter of said second bore with a shoulder formed at the juncture of the two bores;

said shoulder including a surface transverse to the axis of the bores and being adapted to engage the end of a length of tubing inserted in said first bore;

the other end of said body including an axially extending lip tapering outwardly from the inner to the outer wall, said lip being formed in said second bore and terminating at a point in said second bore axially outwardly spaced from said shoulder;

the area of said body between said point of termination of said lip and said shoulder having a wall thickness greater than at any other point along the length of said body;

an arcuate saddle formed on the external periphery of said body, with the juncture of said saddle and body being between the point of termination of said tapered lip and said shoulder and spaced from said termination point a distance at least equal to the wall thickness of the bendable tubing in which said insert is to be received;

said arcuate saddle member being formed on a radius substantially equal to the radius of the outer wall of the length of bendable tubing in which the insert is to be received with the saddle opening toward said other end of said body;

said saddle being defined by upturned portions on diametrically opposed sides of said body, with the distance between the extreme outer edges of said upturned portions being approximately equal to twice the diameter of said body;

said tapered lip including diametrically opposed arcuate recessed portions formed on a radius substantially equal to the radius of the inner surface of said arcuate saddle member;

said recessed portions in said lip being concentric with said arcuate saddle.

References Cited by the Examiner
UNITED STATES PATENTS

| | | | |
|---|---|---|---|
| 311,960 | 2/1885 | Cottrell | 285—202 X |
| 562,074 | 6/1896 | Fowler | 285—202 |
| 1,086,143 | 2/1914 | Davidson | 285—156 |
| 1,360,815 | 11/1920 | Suttill | 285—202 |
| 1,476,756 | 12/1923 | Junkers | 29—512 |
| 1,883,439 | 10/1932 | Adams | 285—189 |
| 1,977,112 | 10/1934 | Coe | 285—287 X |
| 2,481,628 | 9/1949 | Sherman | 153—80 |
| 3,154,130 | 10/1964 | Streeter | 153—81 X |

FOREIGN PATENTS

| | | |
|---|---|---|
| 527,182 | 5/1955 | Italy. |

CARL W. TOMLIN, *Primary Examiner.*